US00RE45437E

(19) United States
(12) Reissued Patent
Morelli

(10) Patent Number: US RE45,437 E
(45) Date of Reissued Patent: Mar. 31, 2015

(54) HAND BAG

(75) Inventor: Giovanni Morelli, Milan (IT)

(73) Assignee: Chloe S.A.S., Paris (FR)

(21) Appl. No.: 29/429,794

(22) Filed: Aug. 16, 2012

Related U.S. Patent Documents

Reissue of:
(64) Patent No.: Des. 621,611
Issued: Aug. 17, 2010
Appl. No.: 29/347,361
Filed: Dec. 14, 2009

(30) Foreign Application Priority Data

Jun. 12, 2009 (FR) ..... 09 2854

(51) LOC (10) Cl. ..... 03-01
(52) U.S. Cl.
USPC ..... D3/321; D3/243
(58) Field of Classification Search
USPC ..... D3/242, 243, 240, 244, 245, 246, 232, D3/233, 321, 324, 318; 150/100, 103–110, 150/113, 114, 118, 119
See application file for complete search history.

(56) References Cited

U.S. PATENT DOCUMENTS

| | | | | | |
|---|---|---|---|---|---|
| D107,680 | S | | 12/1937 | Goldsmith | |
| D246,939 | S | | 1/1978 | Casser | |
| D324,451 | S | * | 3/1992 | Dixsaut | D3/243 |
| D512,566 | S | * | 12/2005 | Nuovo et al. | D3/321 |
| D523,241 | S | | 6/2006 | Gonzalez | |
| D582,154 | S | * | 12/2008 | Gonzalez | D3/243 |
| D582,669 | S | * | 12/2008 | Javits, Jr. | D3/243 |
| D584,045 | S | | 1/2009 | Gonzalez | |
| D591,043 | S | | 4/2009 | Gonzalez | |
| D594,652 | S | | 6/2009 | Guyon et al. | |
| D597,305 | S | * | 8/2009 | Gonzalez | D3/242 |
| D616,647 | S | | 6/2010 | Dolce et al. | |
| D657,140 | S | | 4/2012 | Guyon et al. | |

* cited by examiner

*Primary Examiner* — Phillip S Hyder
(74) *Attorney, Agent, or Firm* — Fross Zelnick Lehrman & Zissu, P.C.; Charles T. J. Weigell, Esq.

(57) CLAIM

The ornamental design for a hand bag, as shown and described.

DESCRIPTION

FIG. 1 is a *front* perspective view of a hand bag;
FIG. 2 is a front view of the hand bag;
FIG. 3 is a rear view of the hand bag;
[FIG. 4 is a left side view of the hand bag;]
*FIG. 4 is an elevation view of the hand bag's right side*;
[FIG. 5 is a right side view of the hand bag;]
*FIG. 5 is an elevation view of the hand bag's left side*;
FIG. 6 is a top view of the hand bag; and,
FIG. 7 is a bottom view of the hand bag.
*The broken lines depict portions of the hand bag in which the design is embodied that are not considered part of the claimed design.*

1 Claim, 5 Drawing Sheets

Matter enclosed in heavy brackets [ ] appears in the original patent but forms no part of this reissue; matter printed in italics indicates the additions made by reissue.

(Amended)

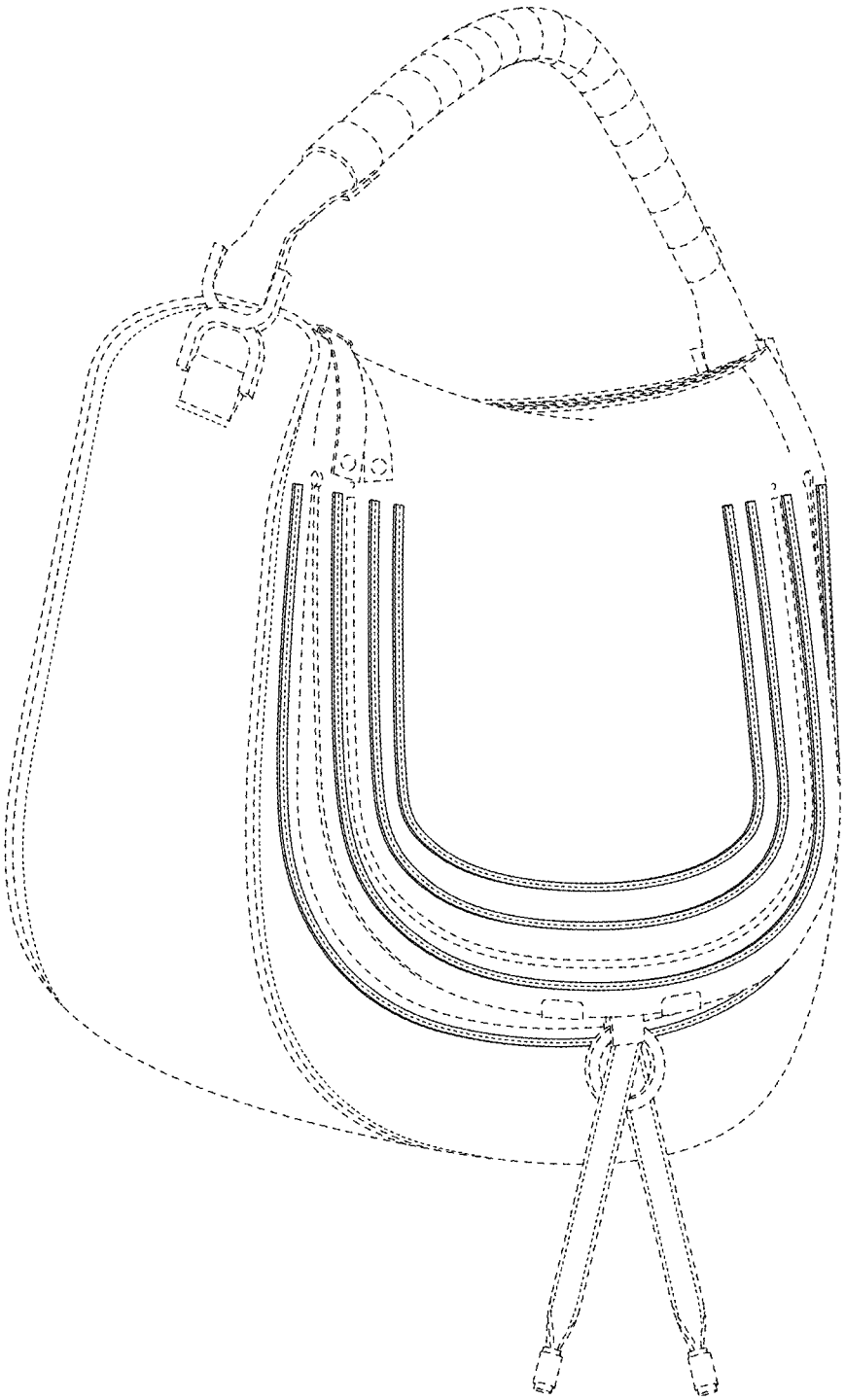
FIG. 1 (Amended)

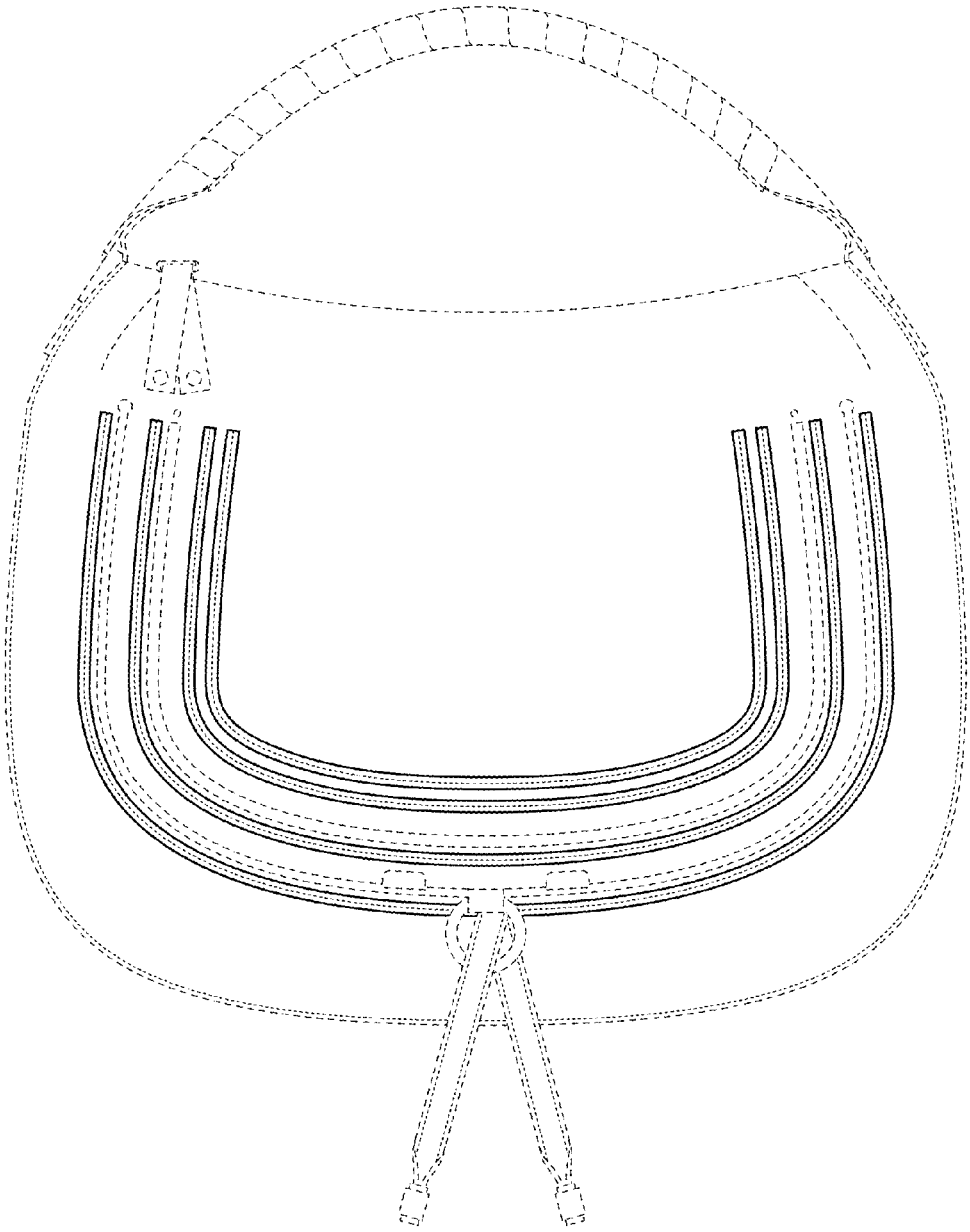
FIG. 2 (Amended)

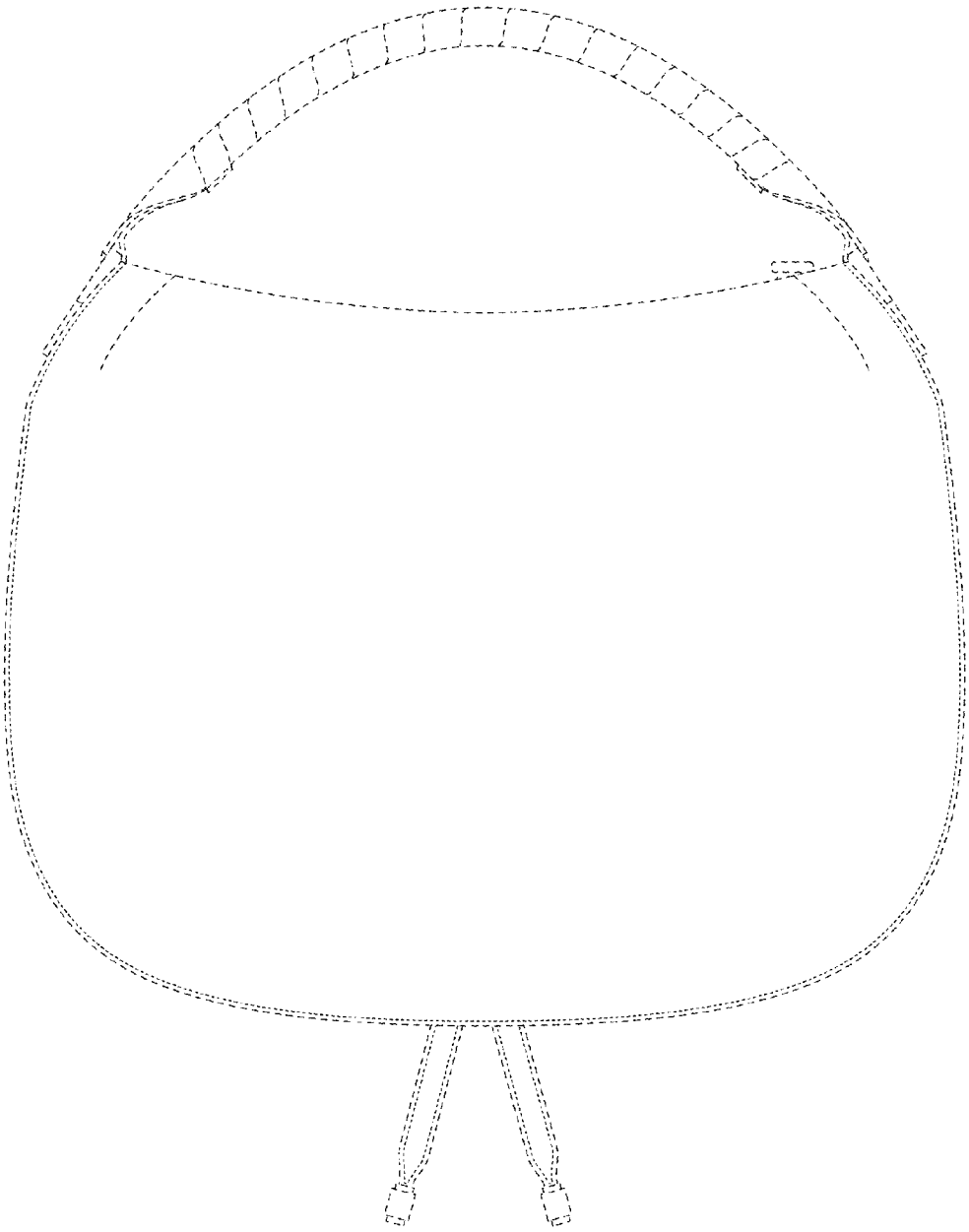
FIG. 3 (Amended)

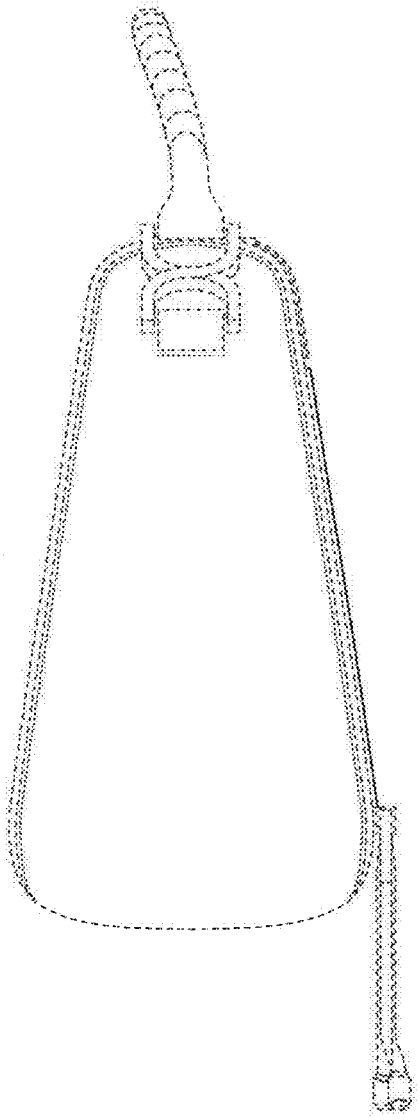
FIG. 4
(Amended)
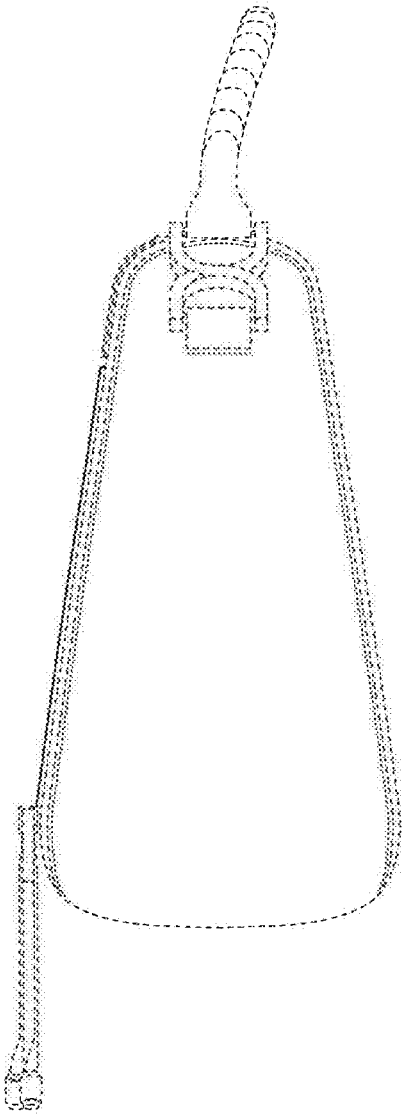
FIG. 5
(Amended)

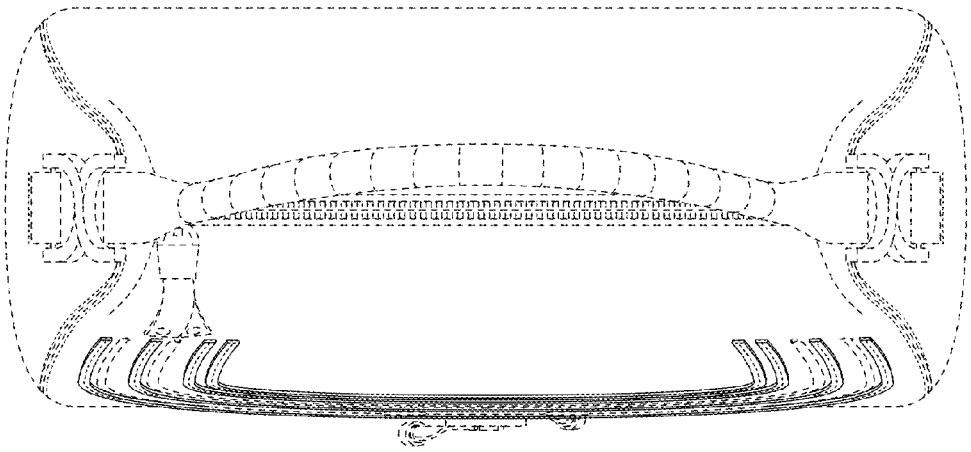
FIG. 6 (Amended)
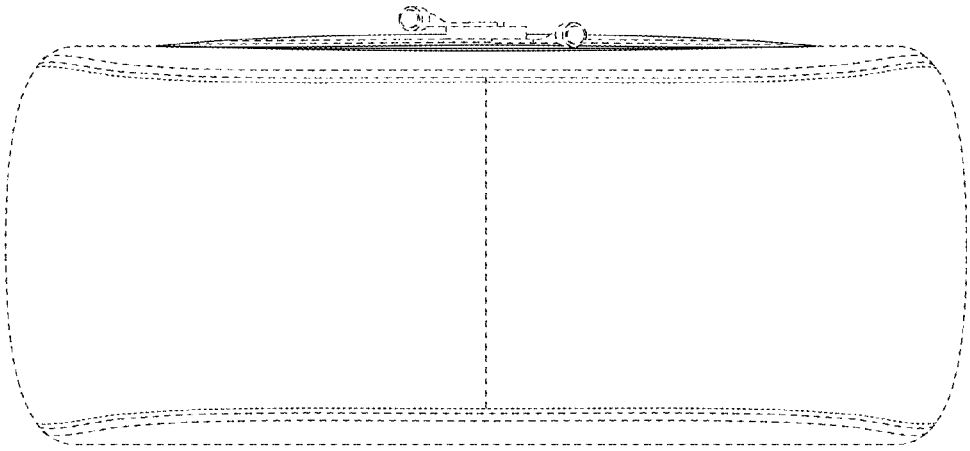
FIG. 7 (Amended)